No. 779,034. PATENTED JAN. 3, 1905.
C. G. FAWKES.
MEANS FOR FASTENING TIRES TO WHEEL RIMS.
APPLICATION FILED JAN. 15, 1904.
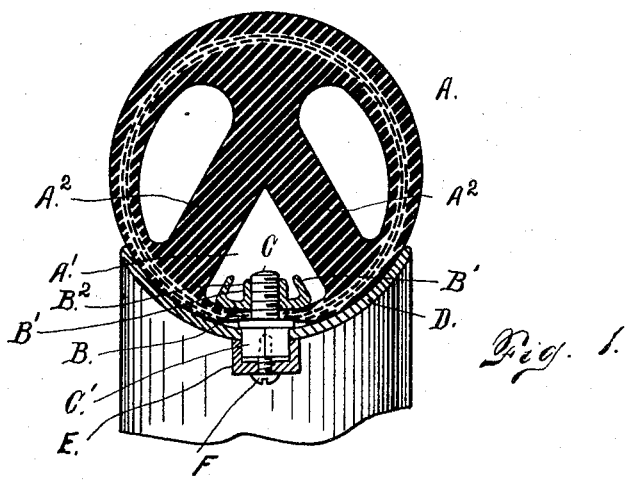
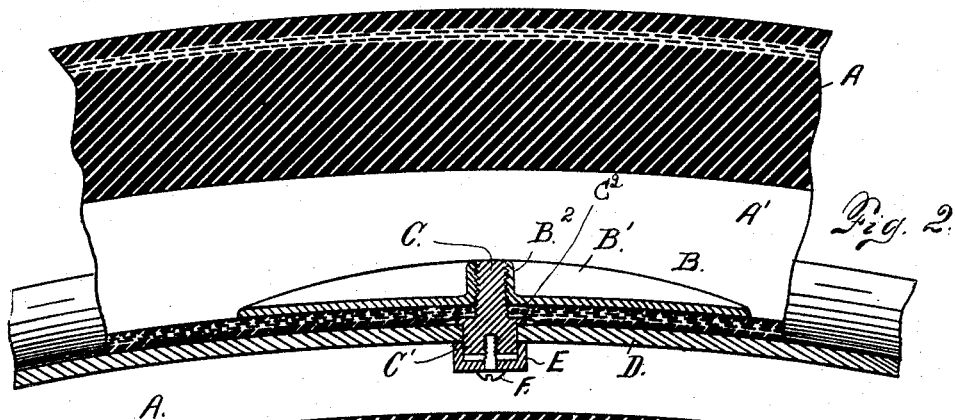
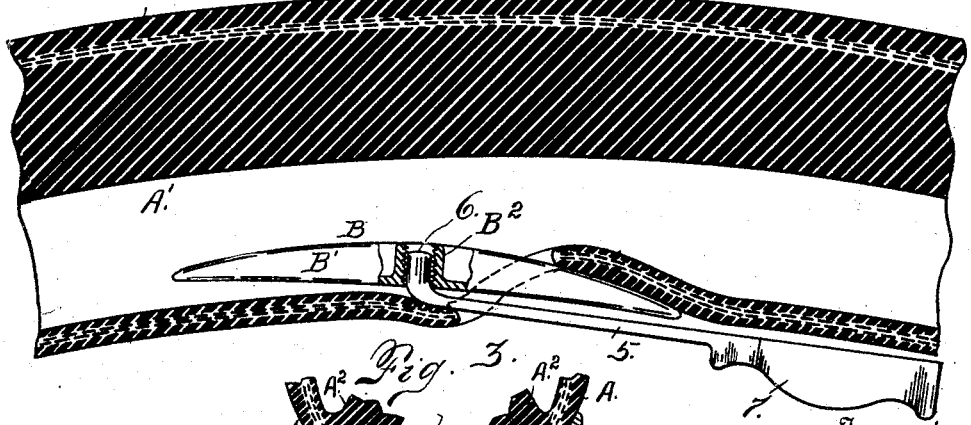

No. 779,034. Patented January 3, 1905.

UNITED STATES PATENT OFFICE.

CHARLES G. FAWKES, OF DENVER, COLORADO.

MEANS FOR FASTENING TIRES TO WHEEL-RIMS.

SPECIFICATION forming part of Letters Patent No. 779,034, dated January 3, 1905.

Application filed January 15, 1904. Serial No. 189,213.

*To all whom it may concern:*

Be it known that I, CHARLES G. FAWKES, a citizen of the United States of America, residing in the city and county of Denver and State of Colorado, have invented certain new and useful Improvements in Means for Fastening Tires to Wheel-Rims; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in means for fastening tires to wheel-rims; and it is more especially intended for use in connection with cushion-tires having an interior cavity located adjacent the inner periphery of the tire. Within this cavity is located a number of shoes or devices adapted to be inserted in a bolt-opening formed in the tire, each of the said shoes or devices having a threaded opening adapted to receive a stud passed through an opening in the inner periphery of the tire and threaded into the opening of the shoe. The head of the stud is polygonal in cross-section and adapted to engage a counterpart opening formed in the rim of the tire. This head of the stud protrudes through the rim, and a cap is applied thereto, which engages the tire around the head of the stud, whereby the parts are held in operative relation with each other.

My object, as the foregoing outlined construction will indicate, is to provide an exceedingly secure and durable means for fastening cushion or other tires of suitable construction to rims of wheels.

Having briefly outlined my improved construction, as well as the function it is intended to perform, I will proceed to describe the same in detail, reference being made to the accompanying drawings, in which is illustrated an embodiment thereof.

In the drawings, Figure 1 is a cross-section of a tire and rim equipped with my improved fastening means. Fig. 2 is a fragmentary longitudinal section of the same. Fig. 3 is a longitudinal section of the tire, illustrating the manner of inserting the fastening-shoes within the cavity of the cushion-tire. Fig. 4 is a fragmentary sectional view illustrating another form of construction.

The same reference characters indicate the same parts in all the views.

Let A designate a cushion-tire of the construction shown in Letters Patent No. 682,977, issued to me September 17, 1901. This tire is provided with an interior V-shaped cavity A', located adjacent its inner periphery and having wings $A^2$ located on opposite sides thereof. Within this V-shaped opening and engaging the inner periphery of the tire on the inside is located any desired number of shoes, each of which I will designate in its entirety by the letter B. Since these shoes are all alike, which is also the case with the coöperating parts used in connection therewith, only one shoe and its connections have been illustrated, since the illustration of a number of these fastening devices would only be repetition and has therefore been deemed unnecessary. Each shoe B is of such width as to give it a good bearing on the tire after its insertion therein and is of such length as to extend a suitable distance on each side of the opening in the tire through which the fastening-stud is inserted. Each shoe is provided with longitudinal flanges B', formed on its outer edges, its central part being reinforced, as shown at $B^2$, to form a threaded opening to receive a stud C, which is passed through an opening in the tire and screwed into the threaded opening of the shoe. The stud, as shown in the drawings, is provided with a square head C', which enters a counterpart opening formed in the rim D, whereby the stud is prevented from turning in the rim and shoe. It is evident that the shoe is first placed in position in the tire and the stud inserted therein with its head protruding. The rim with the hole formed therein is then applied to the head of the stud, after which a cap E, adapted to fit the head of the stud, is applied thereto and fastened to the head of the stud, whereby the cap engages the rim around the stud-head. As shown in the drawings, the cap E is held in place by a screw F. It may, however, be secured in any other suitable manner. It is also evident that the stud may be secured in place by means other than the construction of cap E as shown in the drawings.

In applying the shoes B to the tires openings for the studs C are first made in the inner periphery of the tire. Then the shoes, which are pointed, as shown in the drawings, are forced through these openings, which stretch sufficiently for the purpose. (See Fig. 3.) In inserting these shoes a suitable tool 5 (shown in Fig. 3) may be employed. This tool is provided with a hook-shaped end 6, adapted to enter the threaded opening of the central part of the shoe. The handle 7 of the tool is grasped by the hand of the user and the shoe forced into place in a manner indicated in Fig. 3 of the drawings. The shoe is first forced into the opening away from the user until its extremity nearer the user has entered the tire, after which the shoe is pulled backwardly in the tire until its threaded opening is made to register with the stud-opening in the tire, after which it is evident that the tool may be readily removed. This operation is repeated until the desired number of shoes have been inserted in the tire. It will also be evident that the rim D will have as many openings as there are shoes, each opening being adapted to receive the head of the fastening-stud, whereby the latter is prevented from turning.

Attention is called to the fact that the stud C is provided with a circumferential flange $C^2$, which grasps the outer surface of the inner periphery of the tire and clamps the same to the shoe when the stud is screwed down tightly.

In Fig. 4, which shows a slightly-modified form of construction, the fastening-shoe is designated as a whole or in its entirety by $b$. This shoe, the general construction of which is substantially the same as the shoe B shown in the other views, is provided with a stud $b'$, adapted to pass through an opening in the inner periphery of the tire. To this stud is applied a nut $b^2$, having a hollow interiorly-threaded socket adapted to receive the stud $b'$ of the shoe. The nut is also provided with an exteriorly-projecting flange $b^3$, adapted to engage the outer surface of the inner periphery of the tire and clamp the same to the shoe when the nut is screwed down tightly upon the stud of the shoe. The cap E, applied to the outer extremity of the nut for securing the same to the rim D, is the same as in the other views. This is also true of the fastening-screw F.

Having thus described my invention, what I claim is—

1. In means for fastening rims to tires, the combination of a shoe adapted to be inserted in the tire and engaging the inner surface of the inner periphery thereof, and suitable means connected with the said shoe for fastening the rim to the tire, comprising a part having a threaded connection with the shoe, said part being provided with a flange adapted to engage the outer surface of the inner periphery of the tire.

2. The combination with a tire and rim, of means for fastening the two elements together, consisting of shoes inserted in the tire and having threaded openings, studs passed through the inner periphery of the tire and threaded into the openings of the shoes, the said studs having protruding heads adapted to enter openings formed in the rim whereby the studs are prevented from turning, and suitable means applied to the protruding stud-heads, for securing the rim to the studs.

3. A shoe for fastening rims to tires, consisting of a device having a central threaded opening, the said device having longitudinal flanges on its opposite edges, and being of a width to form a suitable bearing where the shoe engages the inner periphery of the tire and extending lengthwise a suitable distance on each side of the threaded opening.

4. In means for fastening tires and rims together, the combination of a shoe having a central threaded opening, a stud adapted to enter said opening and having a protruding head polygonal in cross-section, and means detachably applied to the stud-head for connecting the latter with the rim, substantially as described.

5. The combination with a tire and rim, the tire having an interior cavity, of a shoe located in said cavity, a part having a threaded connection with the shoe, protruding through an opening near the inner periphery of the tire and adapted to enter an opening in the rim, the said part having a flange adapted to engage the inner periphery of the tire on the outside, and means connected with the said part for securing the rim and tire in the assembled relation.

6. The combination with a tire having an interior cavity, of a shoe located in said cavity and having a part connected therewith and protruding through an opening in the inner periphery of the tire, the said part having a flange adapted to engage the inner periphery of the tire on the outside, and means connected with the said part for securing the rim and tire in the assembled relation.

7. The combination with a tire having an interior cavity, of a shoe located in said cavity and provided with a part protruding from the interior of the periphery of the tire and having a flange adapted to engage the inner periphery of the tire on the outside, and means connected with the said part for securing the rim and tire in the assembled relation.

8. The combination with a rim and tire, the tire having an interior cavity, of a shoe located in said cavity and having a part connected therewith, protruding from an opening in the inner periphery of the tire and entering an opening in the rim, the said part having a flange adapted to engage the inner periphery of the tire on the outside, and means connected with the said part for securing the rim and tire in assembled relation.

9. The combination with a tire having an interior cavity, of a fastening-shoe located in the said cavity and having a threaded opening, and a stud passed through an opening in the inner periphery of the tire and screwed into the threaded opening of the shoe, the stud having a flange adapted to clamp the inner periphery of the tire on the outside and having a head adapted to protrude through an opening in the tire-rim.

10. The combination with a tire having an interior cavity, of a shoe located therein, a part having a threaded connection with the shoe and having an exterior flange adapted to clasp the outer surface of the inner periphery of the tire, and means connected with the said part for securing the rim and tire in the assembled relation.

In testimony whereof I affix my signature in presence of two witnesses.

CHARLES G. FAWKES.

Witnesses:
   DENA NELSON,
   IDA E. O'BRIEN.